3,566,372
NONLINEAR SYSTEMS FOR DIGITAL SWITCHING STORAGE AND CONTROL

Frank Hirst, Kew, Victoria, and Peter George Thorne, Parkville, Victoria, Australia, assignors to The University of Melbourne, Parkville, Victoria, Australia, a corporation of Australia

Filed Mar. 4, 1968, Ser. No. 710,368
Int. Cl. G11c *11/20, 11/36*
U.S. Cl. 340—173 22 Claims

ABSTRACT OF THE DISCLOSURE

A nonlinear system for use as logical switching or storage elements, or elements for the control of signals and which mathematically conforms to a nonlinear differential equation and specifically to $$\ddot{y}+2K\dot{y}+(\pi^2/8)\epsilon(y^2-1)=\gamma\cos\pi t$$

where $0<\epsilon\pi$ 32.0; $\epsilon=4/p^2$, $p$ is the ratio of forcing frequency to the fundamental frequency, K is proportional to the damping, $y^2-1$ is proportional to the nonlinear restoring force and $\gamma$ represents the forcing amplitude; the system being arranged to be in at least two separate states and which can be changed from one to another of these states by variation of one of the parameters. The states are normally defined by positions on a hysteresis curve associated with the appearance and disappearance of subharmonic oscillations.

This invention relates to nonlinear systems and particularly to systems which are adapted for use as logical switching elements, storage elements or elements for the control of signals.

In particular the invention relates to nonlinear systems which mathematically conform to nonlinear differential equations and which thereby form multi-state devices.

The principal object of the invention is to provide such systems.

The invention includes a nonlinear system which mathematically conforms to a nonlinear differential equation, the equation being such that the system can be in at least two different states and can be selectively changed from one to another of these states.

In one particular form the system is provided with a forcing frequency and possesses hysteresis associated with the appearance and disappearance of subharmonic oscillation at a sub-multiple of the forcing frequency.

In another form the system possesses hysteresis associated with the appearance and disappearance of two modes of oscillation, the modes being distinguished by their different amplitudes.

The invention includes the use of the nonlinear systems of the invention as a logical switching element or a storage element or a control element.

The invention also includes the use of a plurality of such systems in a digital computer or other device wherein specific electrical forms of the system of the invention are used as functional elements.

The invention has other aspects which will be understood from the following consideration of various theoretical and practical arrangements which will be described in relation to the accompanying drawings in which:

FIG. 1 is a plot of subharmonic motion of the differential equation $$\ddot{y}+2K\dot{y}+(\pi^2/8)\epsilon(y^2-1)=\gamma\cos\pi t$$

where $0<\epsilon\pi$ 32.0; $\epsilon=4/p^2$, $p$ is the ratio of forcing frequency to the fundamental frequency, K is proportional to the damping, $y^2-1$ is proportional to the nonlinear restoring force and $\gamma$ represents the forcing amplitude;

Figure 1:
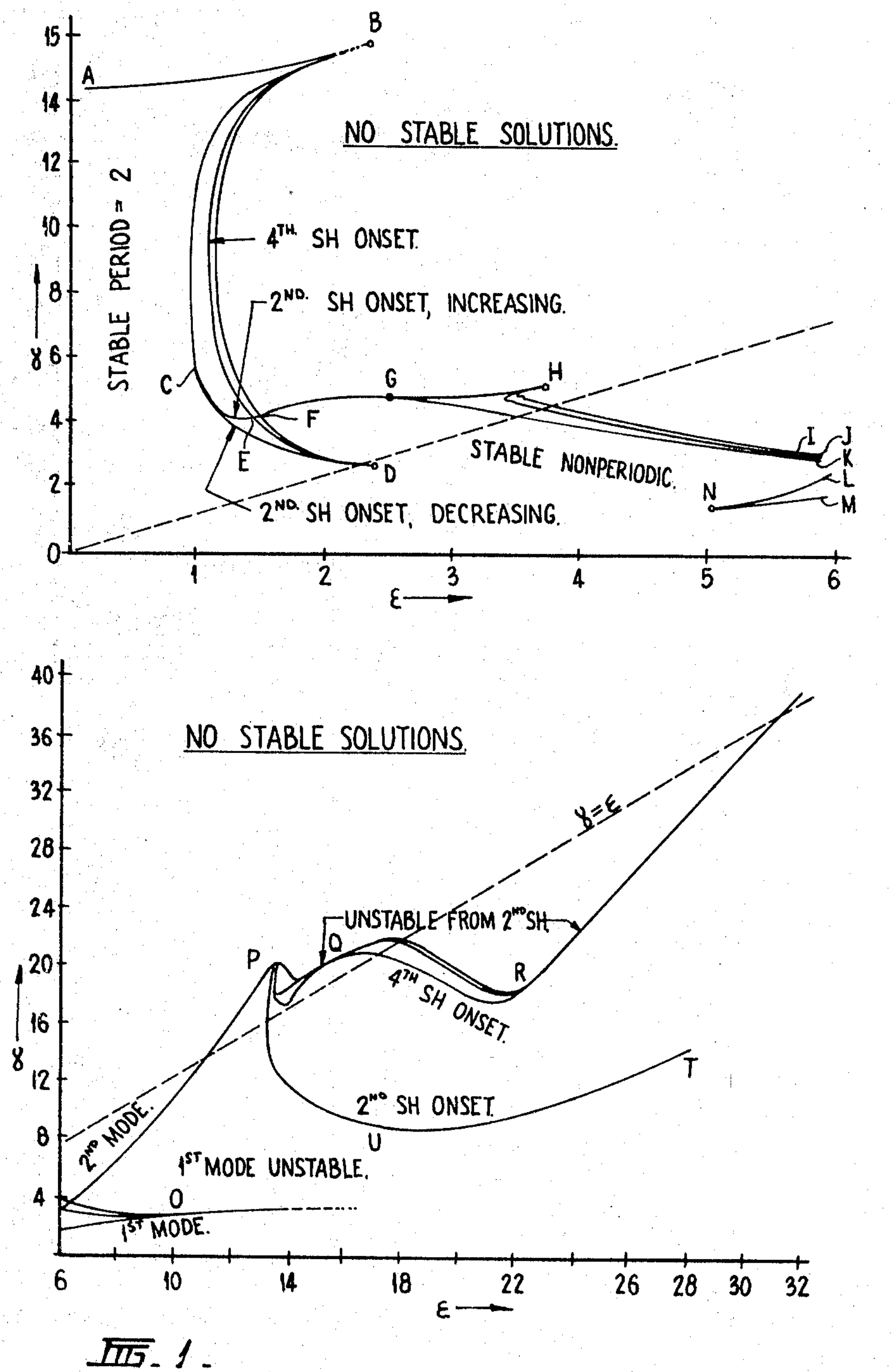

Referring now to FIG. 1, this figure is taken from a paper presented at the Australian Computer Conference 1963, the paper being entitled "Behaviour of Subharmonics of Subharmonics of Even Order Arising in a Nonlinear Differential System" and was written by Hirst, one of the inventors herein, and Pearcey.

In area DEC, for a certain value of $\epsilon$, if the non-linear system is oscillating with a fundamental period, as $\gamma$ is increased a second subharmonic component does not appear until line CE is reached and remains as $\gamma$ is increased further.

For a certain value of $\epsilon$ with the subharmonic present, and decreasing $\gamma$ the disappearance of the second subharmonic components occurs along line CD. Thus in region CED one of two states of oscillation may be present, either fundamental frequency only present or a second subharmonic frequency present. Thus in area CED the state of oscillation present depends on previous history so that a hysteresis effect is exhibited.

In other areas such as the more extensive area CEFD, hysteresis may take place with respect to 2nd, 4th, 8th, 16th and so on subharmonics.

It is the use of these hysteresis effects for the construction of logical switching elements or elements for the storage or control of signals which is a major feature of the present invention and it is to be understood that the invention can be applicable to any such hysteresis arrangement and is not limited to the particular ones illustrated.

In the area NLOM of FIG. 1 either one of two modes of fundamental oscillation is present. Each mode has a different amplitude and the mode present depends on previous history, thus a region of hysteresis exists. One of these two states may be induced by a previous condition and since either state may be detected by its amplitude, such a two state system could be used in the construction of logical switching elements or for constructing elements for the storage or control of signals.

There are other regions where hysteresis involving two modes of different amplitudes occur and the present invention also relates to the utilization of these as switching, storage or control elements. It is to be understood that the invention can be applicable to any such hysteresis arrangement and is not limited to the particular ones mentioned.

Figure 2:
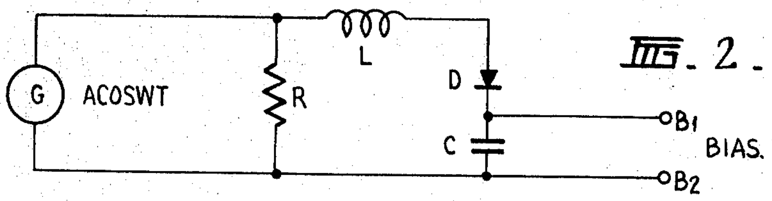
FIG. 2 is a circuit of a system in accordance with the invention.

FIG. 2 shows a simple electrical system which displays the desired characteristics of hysteresis accompanying the changes to and from the subharmonic state and in this figure L is a linear inductor, D is a nonlinear capacitor, which may be a parametric diode, G is a generator which produces the forcing frequency, which is sinusoidal and C is a bypass capacitor which provides a low impedance path across the bias terminals $B_1$ and $B_2$.

The natural frequency $W_0$ of the series circuit and W the forcing frequency are so chosen that the desired value of $\epsilon$ is obtained. Although this circuit satisfies the criteria of the invention it has a disadvantage in that the forcing generator G forms part of the series circuit and thus the generator impedance must be low if circuit efficiency is to be maintained. Under normal circumstances this would imply a large driving power, particularly when several units are coupled in parallel.

Figure 3:
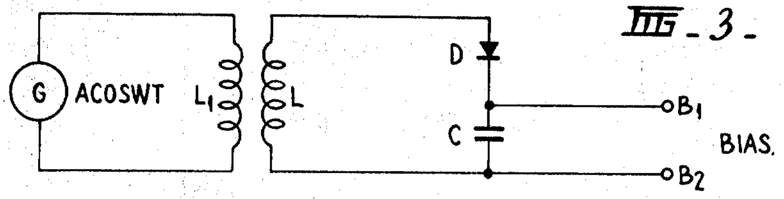
FIG. 3 is a second circuit of a system made in accordance with the invention.

In order to overcome this disadvantage we have derived the circuit illustrated in FIG. 3 and in this the various components correspond with those of FIG. 1 where they bear the same identification. Inductor L′ is a linear inductor and the forcing signal is thus inductively coupled to the nonlinear circuit through L′ and L. This provides a low impedance generator which is effectively in series with the inductance L and the parametric diode D and permits selection of supply impedances since the mutual coupling can be used for impedance matching. The natural frequency depends on the diode D and on the effective inductance. The effective inductance depends on the values of the inductances L and L′ and their mutual inductance.

Figure 4:
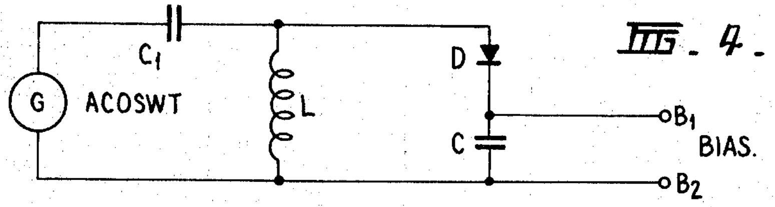
FIG. 4 is a third circuit of a system made in accordance with the invention.

The arrangement illustrated in FIG. 4 also displays the characteristics of subharmonic hysteresis and again similar components are provided with the same references as were those of FIG. 2. The capacitor C′ is a linear capacitor and the arrangement is such that a parallel circuit which may be fed from a high impedance is provided. The system presents high impedance to the generator when operated in regions of subharmonic oscillations thus making this arrangement suitable for parallel coupled arrays. The capacitor C′ is the high impedance coupling element but this could be replaced by any other coupling element which is either capacitive, inductive, resistive or a combination of these.

Certain parametric diodes display characteristic relationships between the applied voltage and capacitance which enable the satisfactory operation of circuits similar to those of FIGS. 2 to 4 without the application of bias. In some cases satisfactory operation can be obtained with a slight forward biasing of the diode and the invention relates to all such arrangements.

The systems of the invention may be switched either by varying the forcing amplitude or by varying the bias. We shall describe applications in which each of these switching methods are used.

Figure 5:
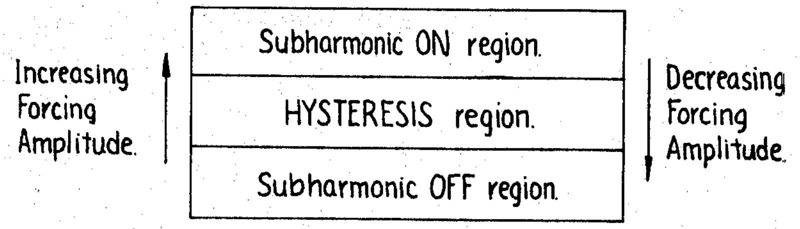
FIG. 5 illustrates the various modes of operation of a system in accordance with the invention.

For the control of a particular subharmonic there will be, in general, three important levels of amplitude which can be seen in FIG. 5. The first is that amplitude which is sufficient to cause and maintain subharmonic oscillation regardless of the previous state of the system. The second that amplitude which will retain the system in the particular state determined by previous switching, whether that state be subharmonic "on" state or subharmonic "off" state. The third is that amplitude which will neither cause nor sustain subharmonic oscillation regardless of the previous state of the system.

Figure 6:
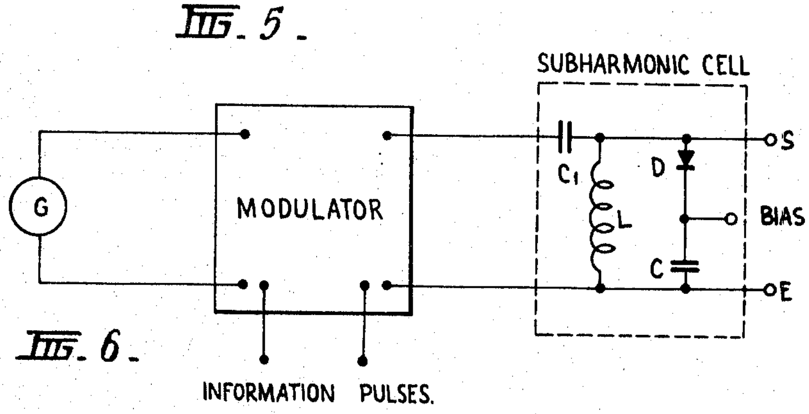
FIG. 6 shows a method of altering the state of a system.
Figure 7:
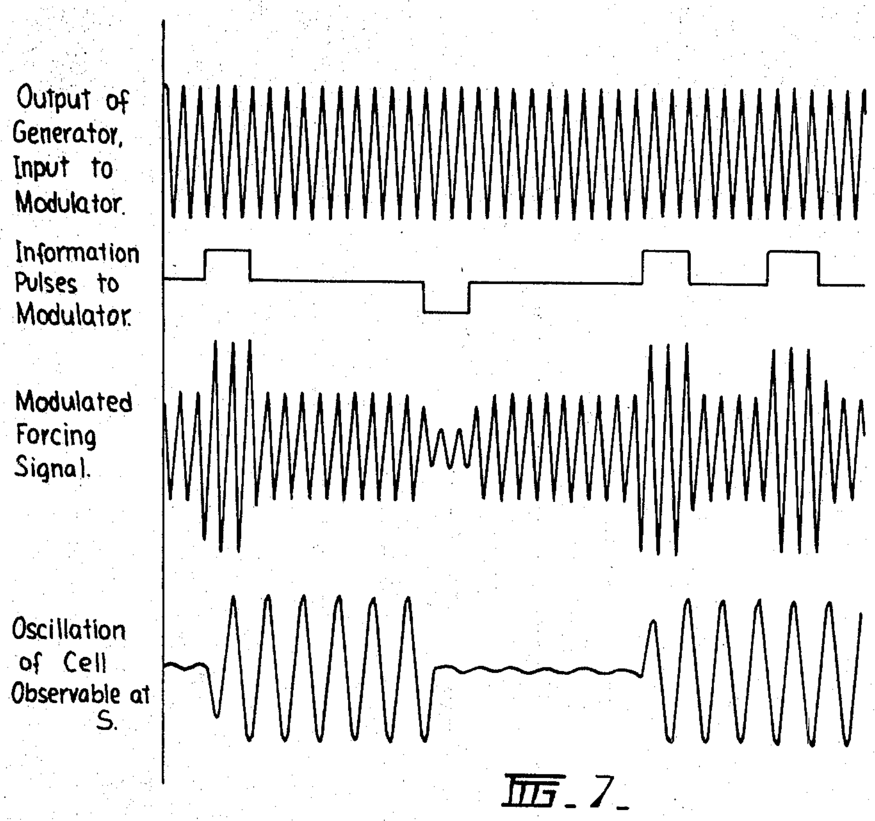
FIG. 7 shows graphical representations of the wave forms in the arrangement of FIG. 6.

In order to alter the state of systems such as those described with relation to FIGS. 2 to 4 the amplitude of the forcing oscillation may be varied by such devices as amplitude modulators. The normal amplitude of the forcing signal is chosen so as to maintain the system in the hysteresis region. By pulsing the modulator, the amplitude of the forcing signal may be altered with respect to the normal level. Subsequently the forcing amplitude returns to its normal level and the state specified by the previous amplitude change is maintained. This arrangement is illustrated in FIGS. 6 and 7. In FIG. 6 we have defined the operative components of the system of the invention as a subharmonic cell and the forcing oscillator G is connected to the subharmonic cell through a modulator to which may be applied information pulses. In FIG. 7 the input to the modulator is shown to be of constant amplitude. The information pulses being applied to the modulator are shown as either positive or negative going pulses and the amplitude modulated output from the modulator, which comprises the forcing signal has areas of increased amplitude where the generator output has been modulated by positive going pulses and areas of decreased amplitude where it has been modulated by negative going pulses.

The state of oscillation of the cell is, as can be seen, controlled by change of the amplitude of the forcing signal and as previously mentioned when the amplitude returns to the normal level there is no change in the state of the cell.

As an indication of the applications of the systems of the invention, which will hereinafter be referred to as a cell, we shall describe the application of a group of such cells as an electronic computer store or memory.

Figure 8:
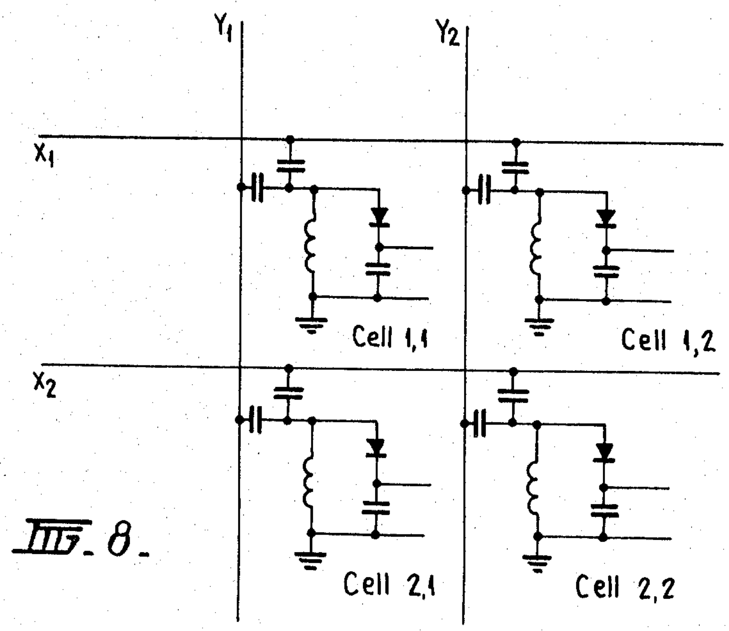
FIG. 8 shows a matrix of parallel capacitively coupled cells having the properties of the invention.

For input and output of information to or from a particular cell arrangement of cells in matrix form such as is illustrated in FIG. 8 is advantageous. Signal lines from the generator/modulator system are used to provide two mutually perpendicular sets of reference lines. These are designated X and Y and a particular X line and a particular Y line reference the cell at their intersection. In the system illustrated in FIG. 8 the amplitude on each of the X and Y reference lines is controlled so that variation of the forcing amplitude on one line to the cell is not sufficient to change its state, whereas variation of both inputs is sufficient to change the state of the cell at their intersection.

| X | Y | State of cell |
|---|---|---|
| 0 | 0 | Unchanged. |
| 0 | −1 | Do. |
| 0 | 1 | Do. |
| −1 | 0 | Do. |
| 1 | 0 | Do. |
| −1 | 1 | Do. |
| 1 | −1 | Do. |
| 1 | 1 | Sub. on. |
| −1 | −1 | Sub. off. |

Figure 9:
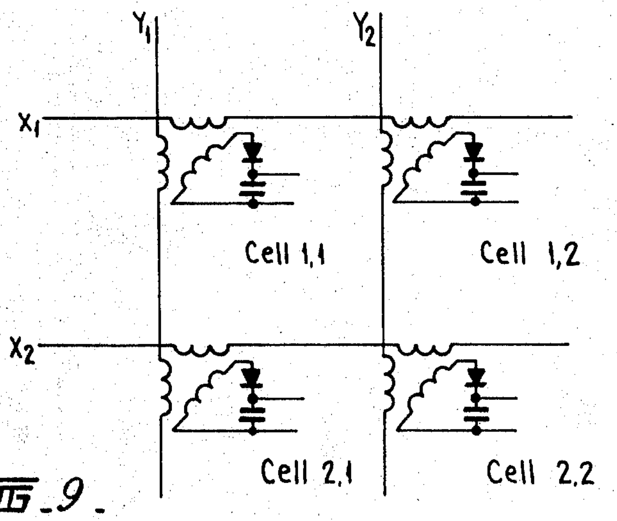
FIG. 9 shows an inductively coupled matrix.

The matrix illustrated in FIG. 9 is similar to that of FIG. 8 the only difference being that the cells of the matrix of FIG. 8 are capacitively coupled to the X and Y lines whereas the cells of the matrix of FIG. 9 are inductively coupled.

As mentioned previously, a change of state equivalent to that obtained by amplitude switching may also be obtained by varying the diode bias whilst maintaining constant the forcing amplitude. In this way the cell may be switched into or out of the subharmonic state by momentary variations of bias, that is, it can be switched by a bias pulse, but again once the switching has been completed, the return of the bias to its normal value causes no further change in state.

Figure 10:
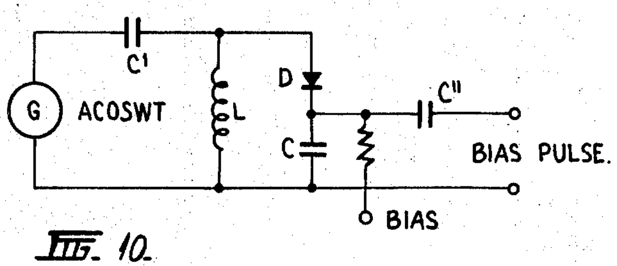
FIG. 10 shows a circuit arrangement which is a modification of that of FIG. 4.

FIG. 10 is illustrative of a bias switched cell and shows the parallel circuit previously described with relation to FIG. 4 but having a bias pulse switching arrangement incorporated therewith. In this system there are three significant levels of bias, the first of which is the subharmonic "on" level, the second the normal level which holds the cell in hysteresis region and the third the subharmonic "off" level.

The amplitude and frequency of the forcing signal is chosen so as to set the system in the hysteresis region at normal bias and the effect of an increase in bias is similar to that of a decrease in forcing amplitude and the effect of a decrease in bias is similar to that of an increase in forcing amplitude.

Bias switched systems can also be provided using the series circuit of FIG. 2 and the inductively coupled circuit of FIG. 3.

Figure 11:
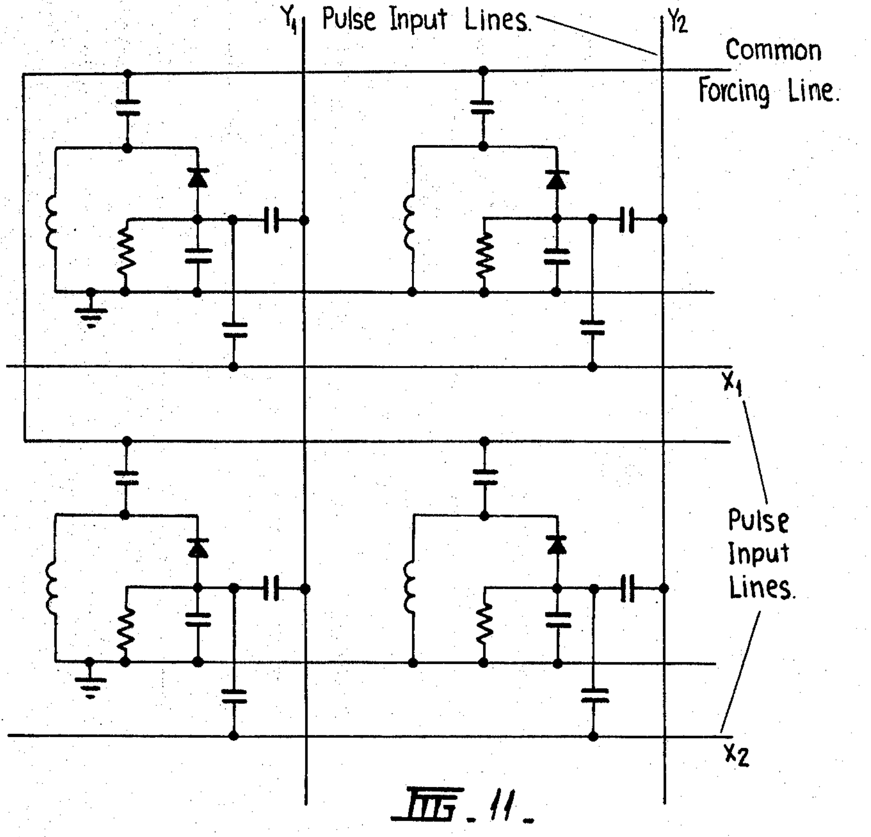
FIG. 11 is a matrix using bias switching in which the selecting lines of the matrix are connected to the cell bias points.

The bias switched arrangement is satisfactory for use in a matrix as a constant forcing amplitude is applied to all cells from a common drive line. The selecting lines of the matrix are pulsed and an X and Y line are coupled to the bias point of each cell. Such an arrangement is illustrated in FIG. 11. As in the amplitude switched case, the levels are arranged to ensure that switching of the selected cell takes place only when both lines are pulsed with the same polarity. Bias pulses of a length five to ten times the period of the forcing signal are sufficient to switch the cell.

Coincident switching of the bias switched systems of FIGS. 10 and 11 is achieved by superimposing the coincident pulses at the same bias point. An alternative method of coincident bias switching employs the circuit shown in FIG. 12.

Figure 12:
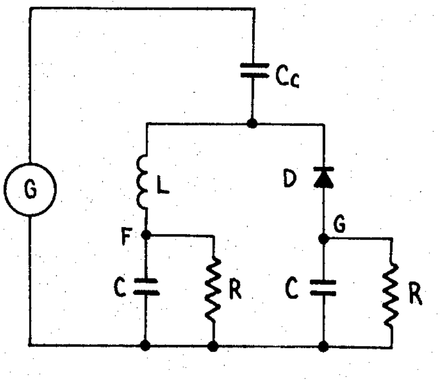
FIG. 12 shows an alternative circuit arrangement using coincident bias switching.

In FIG. 12 there are two points F and G at which a bias pulse may be generated in series with the parametric diode. If a positive bias pulse occurs at F and a negative bias pulse simultaneously occurs at G, the effective reverse bias across the diode is increased. This results in a reduction of the effective forcing amplitude. Conversely, a negative bias pulse at F and a positive bias pulse at G will result in a reduction of reverse bias across the diode, thus increasing the effective forcing amplitude.

The effective bias pulse which occurs across the diode is thus the difference of the incoming pulses. Whereas in the superimposed pulse system of part B above, the bias resulting from coincident input pulses is always less than the sum of the input pulses, in this case the bias pulse is equal in magnitude to the sum of the input pulses, furthermore, this is achieved without the need for a pulse coupling network, thus the pulse lines of a matrix may connect directly to the points F and G.

If the pulse generators connected to these lines are of moderately low output resistance, no return resistance R will be needed from F and G to ground. If the lines have a sufficiently high capacitance to ground, the bypass capacitor C may also be eliminated.

Figure 13:
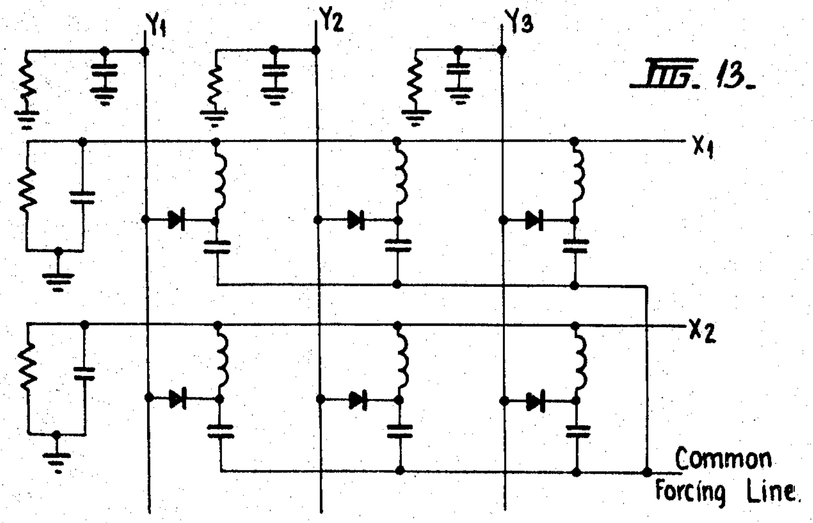
FIG. 13 is a matrix based on the principles of the circuit of FIG. 12.

A matrix design based on these principles is shown in FIG. 13.

The advantages of such a storage system are as follows:

(i) Each cell may be reduced to three components—the parametric diode, the inductor, and the coupling capacitor.

(ii) There is no attenuation of the input pulses as no dividing or isolating network is required.

(iii) The bias pulse amplitude at coincidence of the input pulses is twice that for one input alone.

(iv) There is excellent isolation between pulse lines, since they are only coupled by the parametric diode, furthermore the two pulse lines energized during the writing process will carry pulses of opposing polarity, thus tending to minimize the mean level of any spurious signals appearing in the matrix.

The process of writing in information to a chosen cell is similar to that described previously for the coincident superimposed bias pulse system.

A pulse is applied to the pair of bias pulse lines which intersect at the chosen cell, these pulses are not of sufficient amplitude to switch the other cells which lie on the individual bias lines. The bias pulse which occurs at the selected cell is, however, twice the amplitude of that on each of the lines, and is sufficient to switch the cell. The polarities of these input pulses are chosen so as to either increase the reverse bias at the selected cell (and thus turn off the subharmonic) or to reduce the reverse bias and thus cause the subharmonic mode of oscillation to commence.

In order to complete the usefulness of the arrangement, it is necessary that a satisfactory read out of the information stored in a cell be provided. This read out involves detection of the presence or absence of subharmonic oscillation and for a single cell a filter which can differentiate between a subharmonic frequency and forcing frequency is sufficient to detect the state of the cell. Alternatively the bias level of the cell may be monitored since this level changes when the mode of oscillation changes.

When the cells are arranged in a matrix the individual cell to be interrogated must be specified and the read out signal detected despite the presence of other cells oscillating in either state. In the arrangement shown in FIG. 14 the cell, which is normally coincident amplitude switched as in FIG. 8 or 9, is interrogated by application of "1" write signal on an X line. The effect of this amplitude increase, which will be insufficient to change the state of the cell, will depend on the mode of oscillation of the cell.

If the cell is oscillating subharmonically, there will be an increased amplitude of subharmonic oscillation for the duration of the increased forcing amplitude. If the cell is oscillating at the forcing frequency (subharmonic "off" mode) there will be merely an increase in the amplitude of forcing frequency oscillation in the cell.

Figure 14:
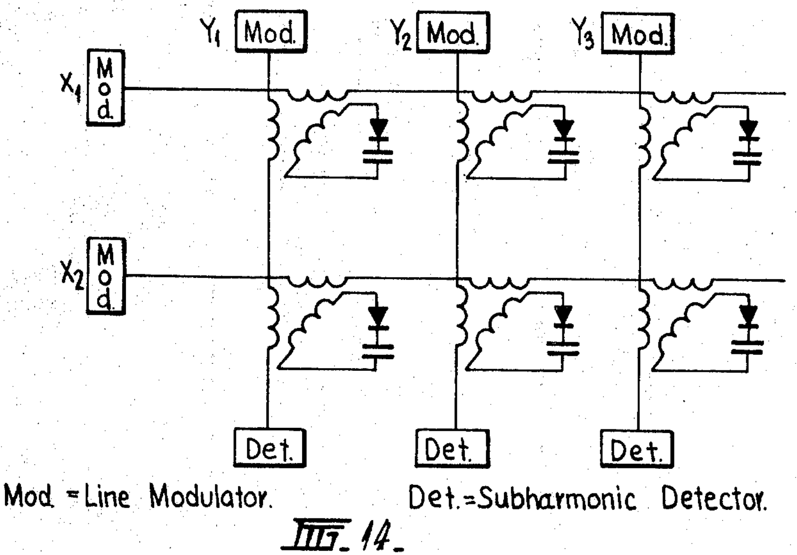
FIG. 14 shows a matrix and its interrogation and detection arrangement.

The effect of the amplitude increase may be detected by sensing the other wire coupled to the cell via an appropriate filter, shown in FIG. 14 as detector Det.

The write/read cycle for the cell referenced by lines $X_2$ and $Y_2$ is:

| $X_2$ | $Y_2$ | State of cell | detected on $Y_2$ |
|---|---|---|---|
| WRITE: | | | |
| +1 | +1 | 1 | |
| −1 | −1 | 0 | |
| READ: | | | |
| +1 | | 0 | 0 |
| +1 | | 1 | 1 |

This system is simple, and provides nondestructive read out, but detection restrictions may limit its use to fast, small storage arrays or logical registers.

Figure 15:
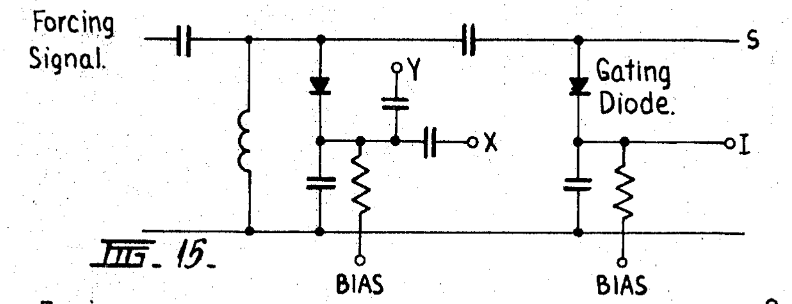
FIG. 15 shows a read out arrangement.

An alternative read out method employs a gated read out system. A satisfactory arrangement for this is illustrated in FIG. 15.

A sample of the oscillating voltage in the cell may be taken out via a diode gate when read out is required. In this system the X and Y lines appropriate to the cell are employed for read in of information by either amplitude switching or bias switching methods, previously described. For read out purpose a set of interrogation lines (I) and a set of sampling lines (S) are necessary. One I line and one S line intersect at a particular cell. The particular cell is selected by pulsing the appropriate I line connected to the cell's gating diode and detecting the frequency of the signal gated out on the sampling line S.

This read out system can be applied to any of the types of nonlinear subharmonic systems mentioned previously herein. Pulse (I) may be derived from one of the matrix write lines, thereby reducing the number of lines require to each cell.

Figure 16:
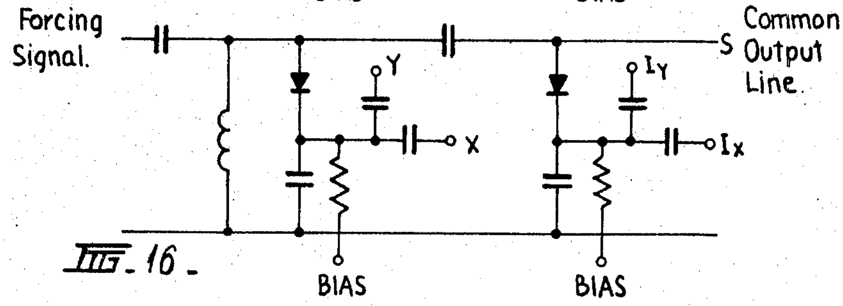
FIG. 16 shows an alternative read out arrangement.

FIG. 16 shows a variation of this system in that the sampling line (S) is common to the whole array of cells and specification of the particular cell is achieved by coincident pulsing of the gating diode by two wires $1_x$ and $1_y$ so that gating will only occur when simultaneous interrogation signals are received.

Figure 17:
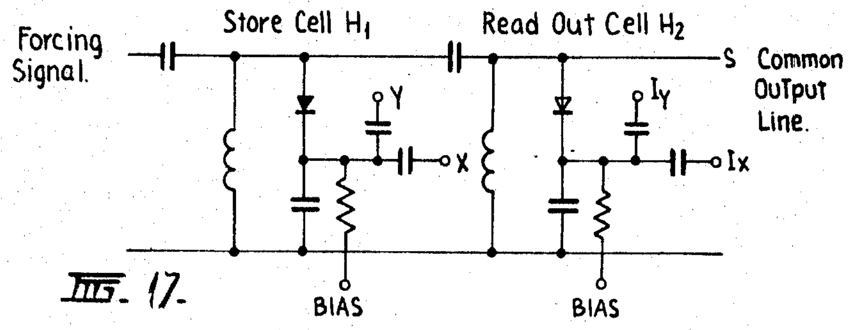
FIG. 17 illustrates a read out arrangement which is suitable for very large arrays.

For large arrays we have developed a cascaded cell read out system. In this arrangement a subharmonic storage cell made in accordance with the invention is coupled to another cell which has a natural frequency approximately one half that of the first cell. This arrangement is illustrated in FIG. 17. The forcing signal for the second cell is thus derived from the first cell. If the cells are arranged in a matrix, read out from a particular cell takes place by switching the bias in the second half of the double cell system by means of coincident pulses on the appropriate X and Y interrogation lines $1_x$ and $1_y$. If the first cell of the system $H_1$ is in subharmonic oscillation at a frequency $w_1$, the combined effect of the two bias pulses and the forcing signal derived from $H_1$ is sufficient to cause the second cell $H_2$ of the double cell to oscillate at its subharmonic frequency $w_1/2$. This is detected on the sensing wire S which is a common sense wire. The only place in the whole array at which this frequency $w_1/2$ occurs is at the specified cell. Furthermore, $w_1/2$ occurs there only if the basic cell is in subharmonic oscillation. If $H_1$ is oscillating at its fundamental frequency $2w_1$, $H_2$ cannot oscillate at the subharmonic frequency $w_1/2$ and the only signal present in $H_1$ or $H_2$ is a fundamental frequency $2w_1$. The second cell $H_2$ need not exhibit amplitude hysteresis characteristics, since it is merely a frequency detector to sense the presence of the subharmonic $w_1$ in the basic cell.

This system of read out is also particularly suitable for use with storage cells which exhibit hysteresis in the change between two modes of fundamental oscillation. The increased amplitude of oscillation in the "on" state being sufficient to excite the second cell to oscillation at its subharmonic frequency, but the small amplitude mode of oscillation of the first cell being insufficient to excite the second cell to oscillation at its subharmonic frequency.

It is apparent that the combination of a subharmonic storage cell, which uses the method of switching shown in FIG. 12 with the cascade method of read-out, in which one of the read out pulses is derived from one of the write reference wires, provides a storage system with the following desirable characteristics:

(i) Simplicity of the basic storage cell. The storage cell may consist merely of two elements—the inductor and a parametric diode, with a suitable coupling element (either inductive or capacitive) for the forcing signal. The read out cell may be similarly simple with coupling to the storage cell and to the sense line being performed inductively or capacitively.

(ii) Simplicity of the matrix. Only three sets of reference wires are required (the set of write in reference wires, the parallel set of read out reference wires and the set of wires perpendicular to these which are used for both read in and write out purpose) in addition to the forcing signal supply line and the read out sense line. Both of the latter lines are common to the entire array.

(iii) Speed of write and read out. These speeds are comparable to those achieved with any of the alternative systems described above. Write in and read out times of the order of 5–10 cycles of the forcing frequency being achievable. It should be noted that the low frequency of oscillation of the read out cell does not markedly reduce the read out speed, since this cell is not a hysteresis device, but a threshold device. Thus subharmonic circuits which have a low Q, and therefore a short transition time between modes of oscillation, may be employed for this purpose.

Figure 18:
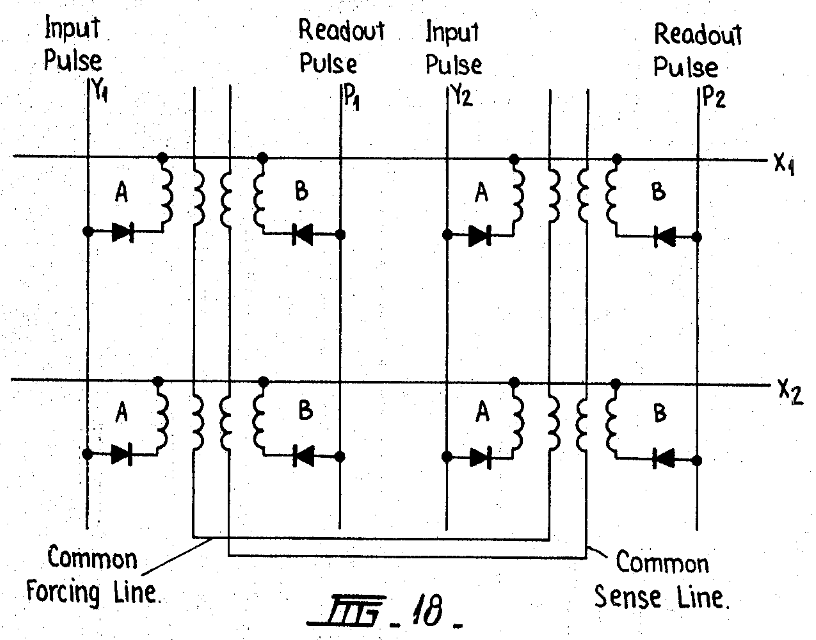
FIG. 18 shows a matrix using subharmonic storage cells and a cascade read out, the matrix being inductively coupled.
Figure 19:
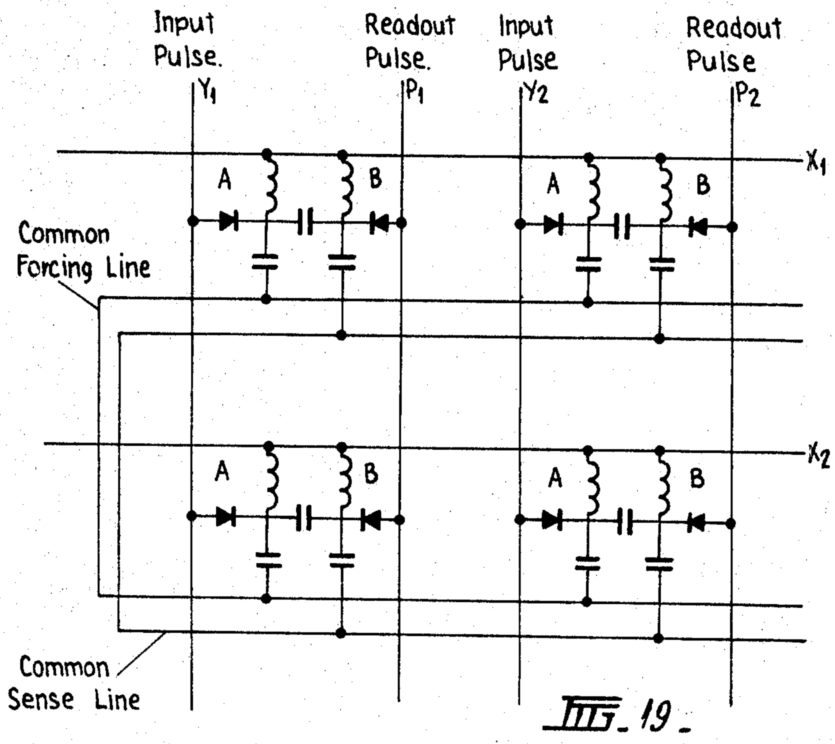
FIG. 19 is a matrix similar to that of FIG. 18 but which is capacitively coupled.

FIG. 18 shows an inductively coupled matrix in accordance with this system, FIG. 19 shows a capacitively coupled matrix in accordance with this system.

Discrete circuit elements are utilized above in the illustrations of the various systems. The above systems may also be constructed of circuit components which combine the properties of two or more such elements, using lumped parameter techniques. The dimensions, topological form and electrical characteristics of the devices described make them particularly suitable for construction by batch fabrication, microminiaturization, or similar techniques.

The invention includes systems constructed by these or other techniques.

We have in this specification described certain particular arrangements of systems which show the desired characteristics of hysteresis accompanying the changes to and from the subharmonic state and particular applications of these systems. It is to be understood that modification can be made in the particular systems described, the particular subharmonic state selected can be varied as can the applications of the various devices and any such variation is to be considered to be within the spirit and scope of the invention.

We claim:

1. A nonlinear system mathematically conforming to a non-linear differential equation, the equation being such that the system can be in at least two different states and can selectively be changed from one another of these states, said system having a forcing frequency and possessing hysteresis associated with the appearance and disappearance of subharmonic oscillations at at least one submultiple of the forcing frequency, and including a generator which produces the forcing frequency, a non-linear capacitor and an inductance in series with the generator, and a parallel resistance across the generator.

2. A system as claimed in claim 1 wherein the differential equation is:

$$\ddot{y}+2K\dot{y}+(\pi^2/8)\epsilon(y^2-1)=\gamma\cos\pi t$$

the elements of the equation as being described herein.

3. A system as defined in claim 1 wherein the system possesses hysteresis associated with the appearance and disappearance of two modes of oscillation, the modes being distinguished by their different amplitudes.

4. A system as claimed in claim 1 including a linear inductance internally coupled with the inductance in the generator circuit, and said nonlinear capacitor being in series with said linear inductance.

5. A system as claimed in claim 1 wherein the nonlinear capacitor has bias means associated therewith.

6. A system as claimed in claim 5 wherein a bypass capacitor is positioned across the bias means.

7. A system as claimed in claim 1 wherein the nonlinear capacitor is a parametric diode.

8. A system as claimed in claim 1 wherein means are provided to vary the forcing amplitude whereby to vary the state of the system.

9. A system as claimed in claim 8 wherein the generator output is fed to a modulator and from the modulator to the remainder of the system wherein information pulses vary the amplitude of the generator thereby modifying the state of the system.

10. A system as claimed in claim 5 wherein the bias is altered whereby to vary the state of the system.

11. In a computer store or memory including the system of claim 1, the system also having a pair of signal lines connected thereto, the lines being adapted to carry a forcing signal wherein the amplitude of the signal in each line is insufficient to change the state of the system, the total amplitude being sufficient to change the state.

12. A store or memory as claimed in claim 11 wherein the lines are capacitively coupled.

13. A store or memory as claimed in claim 12 wherein the lines are inductively coupled.

14. In a computer store or memory as claimed in claim 11 and further having a consistent forcing amplitude applied thereto and a pair of bias lines connected thereto wherein the applied bias signal from either of the lines is insufficient to change the state of the system, a bias being applied to both the lines the bias being sufficient to change this state.

15. A store or memory as claimed in claim 14 wherein the lines are capacitively coupled.

16. A store or memory as claimed in claim 14 wherein the bias lines are connected to different parts of the system whereby the effective bias pulse is not the sum of the bias pulses and wherein the points of connection and the magnitude of the bias pulses are selected to cause the system to assume its other state when both present.

17. A store or memory as claimed in claim 16 where one bias pulse is provided at the non-linear capacitor and a return resistance is provided to ground and the second bias pulse is provided at the parallel inductance and a return resistance is provided to ground.

18. A read out arranged for a system as claimed in claim 1 which comprises monitoring the bias of the non-linear capacitor which bias changes as the state of the system changes.

19. A read out for a store or memory as claimed in claim 11 including a pair of signal lines and means whereby a signal can be injected on one line and the effect of this signal which will not change the state of the cell, ascertained from the other line.

20. A read out for a system as claimed in claim 1 including an interrogative line for each system and a set of sampling lines and a diode gate positioned therebetween.

21. A read out as claimed in claim 20 having a supply line common to a plurality of systems and a pair of gating lines whereby read out occurs only when both gating lines operate simultaneously.

22. A read out arranged for a system as claimed in claim 1 dependent on detection of subharmonic oscillations and which comprises a filter whereby a subarmonic frequency and the forcing frequency of a system can be differentiated.

References Cited

UNITED STATES PATENTS

| | | | |
|---|---|---|---|
| 2,986,724 | 5/1961 | Jaeger | 340—66 |
| 3,114,135 | 12/1963 | Pricer | 340—173 |
| 3,119,985 | 1/1964 | Kaufman | 340—173 |
| 3,162,842 | 12/1964 | Miller | 340—173 |

TERRELL W. FEARS, Primary Examiner

U.S. Cl. X.R.

307—88, 238